(12) United States Patent
Nugent

(10) Patent No.: US 8,909,580 B2
(45) Date of Patent: Dec. 9, 2014

(54) METHODS AND SYSTEMS FOR THERMODYNAMIC EVOLUTION

(75) Inventor: Alex Nugent, Santa Fe, NM (US)

(73) Assignee: KnowmTech, LLC, Albuquerque, NM (US)

( * ) Notice: Subject to any disclaimer, the term of this patent is extended or adjusted under 35 U.S.C. 154(b) by 408 days.

(21) Appl. No.: 13/354,537

(22) Filed: Jan. 20, 2012

(65) Prior Publication Data

US 2012/0191438 A1 Jul. 26, 2012

Related U.S. Application Data

(60) Provisional application No. 61/436,237, filed on Jan. 26, 2011.

(51) Int. Cl.
G06F 17/00 (2006.01)
G06N 5/02 (2006.01)
G06F 17/50 (2006.01)

(52) U.S. Cl.
CPC ........ *G06F 17/5022* (2013.01); *G06F 17/5045* (2013.01); *G06F 2217/78* (2013.01)
USPC .......................................................... 706/46

(58) Field of Classification Search
None
See application file for complete search history.

(56) References Cited

U.S. PATENT DOCUMENTS

| | | |
|---|---|---|
| 5,794,224 A | 8/1998 | Yufik |
| 7,711,491 B2 | 5/2010 | Vandersall et al. ............. 702/19 |
| 2002/0016703 A1 | 2/2002 | Barroux .......................... 703/10 |
| 2005/0090641 A1 | 4/2005 | Valluzzi et al. ............... 530/350 |
| 2011/0145179 A1 | 6/2011 | Nugent |
| 2011/0161268 A1 | 6/2011 | Nugent .......................... 706/26 |
| 2011/0280073 A1* | 11/2011 | Chiu et al. ............... 365/185.08 |

OTHER PUBLICATIONS

Evans et al. "Energy Consumption Modeling and Optimization for SRAM's", IEEE Journal. Of Solid-State Circuits, vol. 30, No. 5, 1995, pp. 571-579.*
Tolat "An analysis of Kohonen's self-organizing maps using a system of energy functions", Biological Cybernetics, 1990, pp. 155-164.*
Yufik, Y. M., "Virtual Associative Networks: A Framework for Cognitive Modeling," Brian and Values: Is a Biological Science of Values Possible (1998) Lawrence Erlbaum Associates, Inc., Pribram, K. H. (ed.), Mahway, NJ, pp. 109-177.

(Continued)

*Primary Examiner* — Li-Wu Chang
(74) *Attorney, Agent, or Firm* — Kermit D. Lopez; Luis M. Ortiz; Ortiz & Lopez, PLLC

(57) ABSTRACT

Methods and systems for thermodynamic evolution. Adaptive control systems are constructed based on the property of volatile matter to self-organize to maximize the dissipation of energy. The logical state of sensory nodes in a node circuit are set and projected into a network. Then, the system evaluates logical state of processing nodes by summing input currents of processing nodes and project processing node's state into network. The strength of processing node is increased such that logical state of sensory node matches with logical states of processing node by utilizing plasticity rule. The system is configured to maximize energy dissipation by creating weight structures to stabilize nodes with logical state. The internal positive feedback of node circuit forces competition between nodes such that one node is driven to high logical state and other nodes to low logical state.

18 Claims, 15 Drawing Sheets

(56) References Cited

OTHER PUBLICATIONS

Yufik, Y. M. et al., "Swiss Army Knife and Ockham's Razor: Modeling and Facilitating Operator's Comprehension in Complex Dynamic Tasks," IEEE Transactions on Systems, Man, and Cybernetics—Part A: Systems and Humans (2002) 32(2):185-199.

Yufik, Y. M., "How the Mind Works: An Exercise in Pragmatism," Inst. of Med. Cybern. Inc. (2002) Gaithersburg, MD, 5 pages.

Mandischer, M., Geyer, H., Ulbig, P.; Neural Networks and Evolutionary Algorithms for the Prediction of Thermodynamic Properties for Chemical Engineering; Department of Computer Science XI, University of Dortmund, Germany Institute for Thermodynamics, University of Dortmund, Germany.

* cited by examiner

| SS | LF | $X_0,X_1$ 0,0 | 0,1 | 1,0 | 1,1 |
|---|---|---|---|---|---|
|  | 0  | 1 | 1 | 1 | 1 |
|  | 1  | 1 | 1 | 1 | 0 |
|  | 2  | 1 | 1 | 0 | 1 |
|  | 3  | 1 | 1 | 0 | 0 |
|  | 4  | 1 | 0 | 1 | 1 |
|  | 5  | 1 | 0 | 1 | 0 |
|  | 6  | 1 | 0 | 0 | 1 |
|  | 7  | 1 | 0 | 0 | 0 |
| A | 8  | 0 | 1 | 1 | 1 |
|   | 9  | 0 | 1 | 1 | 0 |
| C | 10 | 0 | 1 | 0 | 1 |
| B | 11 | 0 | 1 | 0 | 0 |
| B | 12 | 0 | 0 | 1 | 1 |
| C | 13 | 0 | 0 | 1 | 0 |
|   | 14 | 0 | 0 | 0 | 1 |
| A | 15 | 0 | 0 | 0 | 0 |

FIG. 13

METHODS AND SYSTEMS FOR THERMODYNAMIC EVOLUTION

CROSS-REFERENCE TO PROVISIONAL APPLICATION

This nonprovisional patent application claims the benefit under 35 U.S.C. §119(e) of U.S. Provisional Patent Application Ser. No. 61/436,237 filed on Jan. 26, 2011 and entitled "Methods and Systems for Thermodynamic Evolution," which is hereby incorporated by reference in its entirety.

TECHNICAL FIELD

Embodiments are generally related to self-organizing circuits. Embodiments also relate to the construction of adaptive control systems based on properties of volatile matter to self-organize for the maximum dissipation of energy. Embodiments additionally relate to methods and systems for thermodynamic evolution.

BACKGROUND OF THE INVENTION

Everything in the universe originates from natural processes of self-organization. Interestingly, "Artificial" artifacts are attributed to human creation, while "Natural" artifacts are attributed to natural evolution. The reality is that everything in the world is a result of matter configuring itself, including of course the technology that humans manufacture. There is no line between the natural and artificial worlds. The failure to attribute modern technology to a natural process is perhaps a result of the limited scope of the theory of evolution. Since the theory of evolution in its current form describes evolution as mutations on the genotype and selection on the phenotype, the focus on the lower and higher levels of organization can be neglected. For example, the theory of evolution does not answer the following questions, such as, how do molecules that form a cell ultimately give rise to the collective cell, how many trillions of cells that make up our bodies organize themselves, how the individuals that make up a species ultimately configure themselves into a society with individual specialization and division of labor, how the millions to billions of neurons that make up a biological nervous system organize to control a body within an environment and how human economies emerge. Although biological organization occurs at multiple levels, the theory of evolution describes only two disconnected levels and one mechanism: a molecule that encodes a genotype, a body that encodes the phenotype, and the selection of configurations through reproduction and death.

Physics can arguably be described as a mathematical accounting of energy. Objects in the physical world organize themselves to reduce their potential energies. A rock rolls down the hill because it reduces its gravitation potential energy. A chemical reaction proceeds because its chemical potential energy is reduced. Electronic circuits proceed because electrons are moving from regions of high electrical potential to lower potentials. It is of course logical that the mechanisms that describe thermodynamic evolution are simply an accounting of energy within the as-of-yet unaccounted area of living systems. That is, a necessary and complete account of thermodynamic evolution can be attained from one more description of matter's continual quest to reduce energetic potentials.

Thermodynamic Evolution (TE) concerns the self-organization of units into larger collectives. It is thus a requirement that a collection of units is provided which, through their interaction, may dissipate one or more energy potentials. These units comprise collections of atoms and molecules with three defining characteristics. First, atoms and/or molecules that form the thermodynamic unit must be capable of exchanging matter or energy with other units. Second, the manner in which the units exchange matter must be configured through a smaller subset of atoms or molecules (configuration bits) who's physical state is volatile. Third, the stability or mutation rate of the configuration bits is gated by the energy dissipation rate of the thermodynamic unit such that the configuration bits are more stable as the thermodynamic unit dissipates more energy. Therefore, there exists a need for a number of thermodynamically-evolving systems constructed according to the above requirements and characteristics.

BRIEF SUMMARY

The following summary is provided to facilitate an understanding of some of the innovative features unique to the disclosed embodiment and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for self organizing circuits.

It is another aspect of the disclosed embodiments to provide methods for construction of adaptive control systems based on property of volatile matter to self-organize to maximize dissipation of energy.

It is a further aspect of the present invention to provide methods and systems for thermodynamic evolution.

The aforementioned aspects and other objectives and advantages can now be achieved as described herein. Adaptive control systems are constructed based on the property of volatile matter self-organizing to maximize the dissipation of energy. The logical state of S-nodes in a node circuit are set and projected into a network. Then, the system evaluates logical state of P-nodes by summing input currents of P-nodes and project P-node's logical state into network. The strength of P-node is increased such that logical state of S-node matches with logical states of P-node by utilizing plasticity rule. The system is configured to maximize energy dissipation by creating weight structures to stabilize nodes with logical state. The internal positive feedback of node circuit forces competition between nodes such that one node is driven to high logical state and other nodes to low logical state. The energy minima of such a circuit correspond to its logical function so that any perturbation would be countered by the actions of the plasticity rule, restoring the function. Such a node circuit may "heal" itself.

A number of embodiments, preferred and alternative, are disclosed. For example, in a preferred embodiment, an electronic system for thermodynamic evolution can be implemented. Such a system can include at least one node circuit with a logical state dependent on a configuration of volatile memory elements comprising, for example, at least one memristor such that a mutation rate of the volatile memory elements is reduced as the at least one node circuit dissipates increasing energy, and wherein energy is acquired by the at least one node circuit as a function of a logical state of the at least one node circuit. The volatile memory elements can also include at least one transistor circuit. Additionally, he energy acquired by the node circuit(s) can be represented as a charge on a capacitor, a conductance of the rnernristor(s), and/or a binary number. In some embodiments, the aforementioned logical state can configure dot product operations. In other embodiments, the aforementioned logical state can configure a routing table. The energy can be generated during predictions of sensory data via the at least one node circuit and the volatile memory elements.

In another embodiment, an electronic system for thermodynamic evolution can be implemented, which includes volatile memory elements comprising at least one of a memristor and a transistor circuit; and at least one node circuit with a logical state dependent on a configuration of the volatile memory elements, such that a mutation rate of the volatile memory elements is reduced as the at least one node circuit dissipates increasing energy, and wherein enemy is acquired by the at least one node circuit as a function of logical state of the at least one node circuit.

In yet another embodiment, a method for thermodynamic evolution, can be implemented, which includes the step of configuring at least one node circuit with a logical state dependent on a configuration of volatile memory elements comprising at least one memristor, such that a mutation rate of the volatile memory elements is reduced as the at least one node circuit dissipates increasing energy, and wherein energy is acquired by the at least one node circuit as a function of a logical state of the at least one node circuit.

BRIEF DESCRIPTION OF THE DRAWINGS

The accompanying figures, in which like reference numerals refer to identical or functionally-similar elements throughout the separate views and which are incorporated in and form a part of the specification, further illustrate the disclosed embodiments and, together with the detailed description of the invention, serve to explain the principles of the disclosed embodiments.

FIG. 13 illustrates a truth table of a two input one output gate showing the synaptic states and their corresponding logic functions, in accordance with the disclosed embodiments;

DETAILED DESCRIPTION

Figure 1:
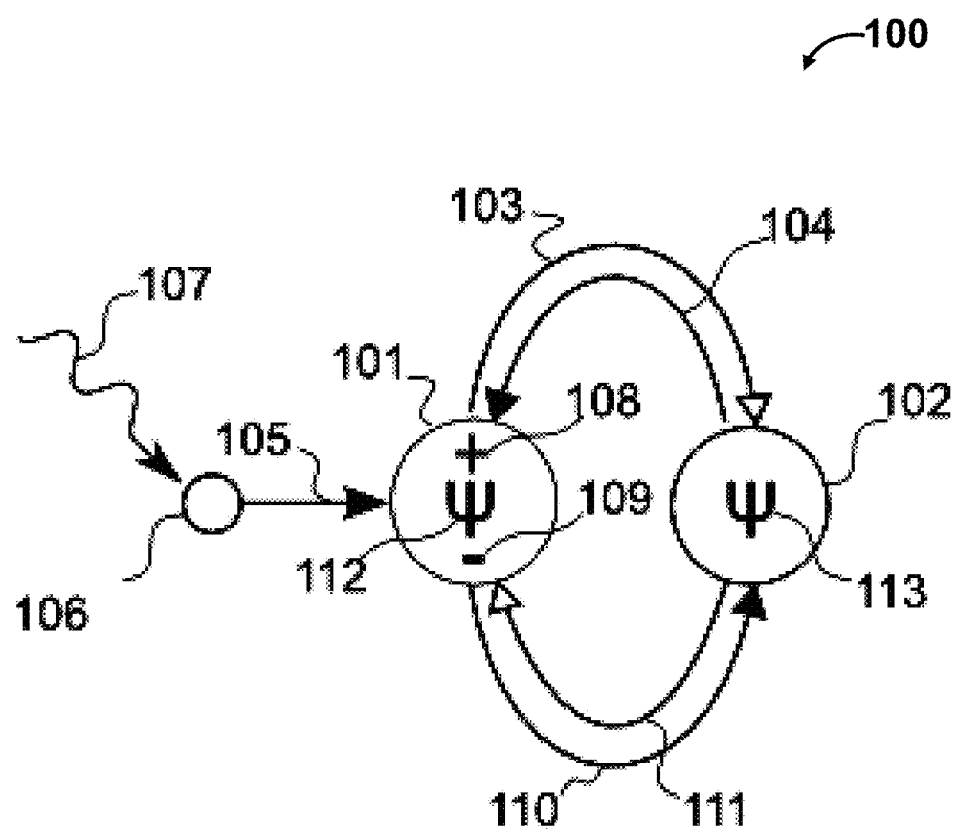
FIG. 1 illustrates a two-node circuit diagram of a system showing energy flow between the nodes, in accordance with the disclosed embodiments.

The particular values and configurations discussed in these non-limiting examples can be varied and are cited merely to illustrate at least one embodiment and are not intended to limit the scope thereof.

The embodiments now will be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Thermodynamic Evolution (TE) is responsible for the creation of structure from a homogeneous state. Within the physics vernacular, TE is responsible for "symmetry breaking", where symmetry describes the high-entropy state where energy is evenly spread throughout the assembly.

Structure requires work to build and maintain it against the inevitable decay wrought by the second law of thermodynamics. Consider, for example, a primitive building constructed of dried mud bricks. It takes the dissipation of energy to assemble and repair the brick. Dirt and water must be mixed with straw that must be grown. Molds must be formed and the bricks dried. The bricks must then be lifted against the gravitational potential into a non-homogenous configuration. The bricks degrade over time from exposure to wind or water. Without constant repair, the building will dissolve back into the homogenous state from which it emerged. The repair of the mud structure is directly linked to its ability to dissipate energy within the world.

For example, the structure's inhabitant (also a volatile structure), may use the structure as a residence. If the structure succeeds in protecting the inhabitant from the degrading effects of the environment then the inhabitant will be better able to conserve energy, which may be directed toward the repair of the structure. On the other hand, if the structure fails to increase the inhabitance ability to dissipate energy, for example by requiring the inhabitant to spend more time on its repair than on obtaining food and resources, then the structure can be seen as actively participating in its own destruction. If given an alternative structure or in the event of death or sickness of the inhabitant, the structure will decay back into the homogenous state from where it came.

The more resistant to decay, the more energy required to assemble the structure. A house built of large carved stones is more resistant to decay but requires a great deal more energy to form. The same is true of electronic memory elements. The ability of a memory bit to hold its configuration against the background thermodynamic energy fluctuations is dependent on the state's potential energy barriers. The higher these barriers, the more energy must be dissipated to configure the bit.

TE is built on the assumption that structure in the world exists for a precise purpose, the dissipation of energy. "Survival of the fittest" may thus be reformulated to a more exact physical statement. Structure that is responsible for more energy dissipation in the world is more stable and thus persists for longer periods of time.

FIG. 1 shows a simple two-node circuit 100. The possible two node types are Sensory Nodes (S-Nodes) 101 and Processing Nodes (P-Nodes) 102, S-Nodes 101 are responsible for two functions. First, they provide an energy potential along which dissipating current flows, represented in the FIG. 1 by the positive sign 108 and negative sign 109. Assume that the dissipating current flows from positive terminal to the negative terminal. Second, the node's logical state is set by an external signal 105, which preferably comes from a detector 106 sensing an external event 107. S-Nodes 101 serve the function of both providing an energy potential and also gating access to this energy contingent on its logic state being predicted by P-Nodes 102. The P-Node's 102 function is to self-configure its state via thermodynamic mechanisms so as to unlock the energy potentials of S-Nodes 101.

In two-node circuit 100 two flows exist, namely Information flow 110 and 104 and the Energy flow 103 and 111. When an external event 107 is detected, the logical state 112 of one or more S-Nodes are set. The logical state 112 is projected into the network through node connections, where P-Nodes 102 sum their input currents and evaluate into a logical state 113, which is further projected into the network and ultimately onto the S-Node 101. The connection between S-node 101 and P-node 102 will grow stronger when the logical state 112 of S-node 101 match the logical state 113 of the input P-node 102. As the connection grows stronger, the energy flow will increase and stabilize the P-node's functional state.

Figure 2:
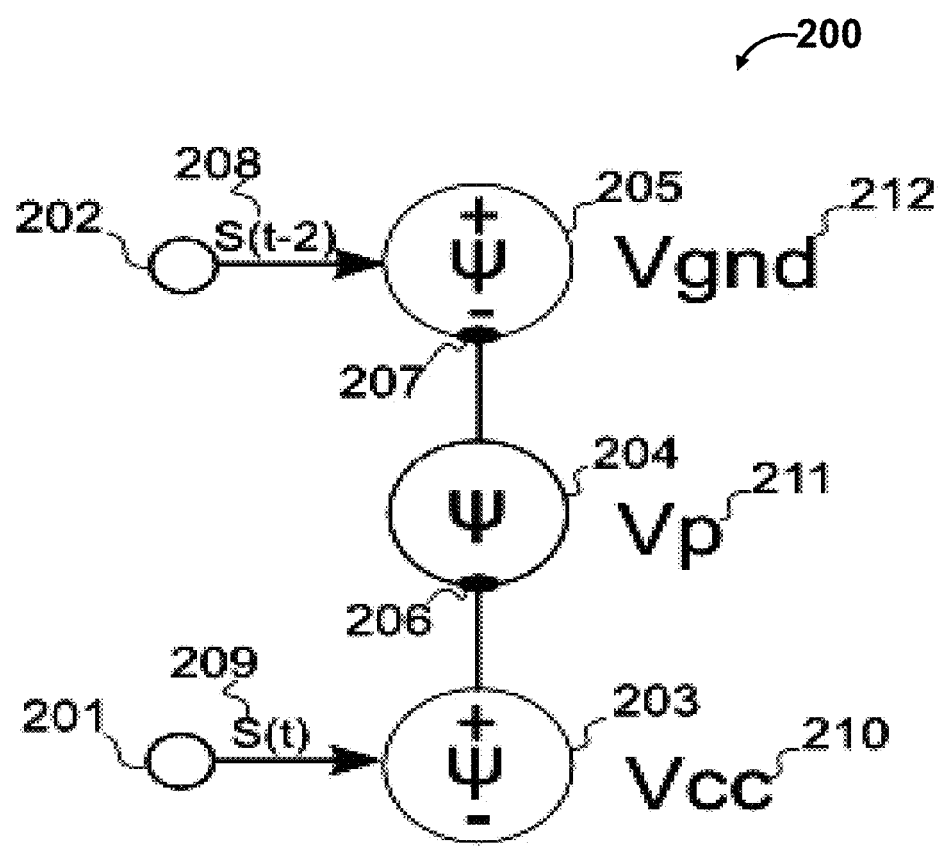
FIG. 2 illustrates a three-node circuit diagram of a system showing a path between detectors, in accordance with the disclosed embodiments.

FIG. 2 depicts a three-node circuit 200 providing a path between detectors 201 and 202. Presume that the detector 201 is driven by binary signal S(t) 208 and that detector 202 is driven by binary signal S(t−2) 209. That is, the detector 202 represents a time-delay of the detector 201 by exactly two time steps. At t=0, the detector 201 fires so that the logical state of S-node 203 is high. In the next time step P-node 204 may evaluate high or low depending on the state of weight 206, which may take both positive and negative values. That is, the logical state of P-node 204 can be given by the equation:

$$Y = H\left(\sum_{i}^{N} w_i x_i - t\right) \quad \text{Eq (1)}$$

$$H(y) = \begin{cases} 1 & y > 0 \\ 0 & y < 0 \end{cases} \quad \text{Eq (2)}$$

The nodes input current $I_{in}$ can be found by the sum over all of its inputs currents given by, $$I_{in} = \sum_{i}^{N} w_i x_i$$

where $x_i$ is the $i^{th}$ input voltage and $w_i$ the $i^{th}$ input weight and N is the total number of inputs. If the input current $I_{in}$ is greater than a threshold t, the node will output a logical high voltage say 1, otherwise it will output a logical low voltage say 0. The logical state of P-node 204 will project to S-node 205. This pathway constitutes the forward Information pathway. Note that if weight 206 were negative, P-node 204 would fail to fire and thus fail to match the logical state of S-node 205. Assume a mechanism exists which will increase the strength of weight 207 such that the logical output of P-node 204 match the logical state of S-node. Further assume that the mechanism will increase the strength of weight 206 such that the logical state of S-node 203 matches the logic state of P-node 204. Such a mechanism is called plasticity rule. Let us introduce an important variable to the rule, the node potential.

S-node provides a potential. Presume such a potential is an electrical potential, although can also be a chemical potential. Suppose that each S-node provided an electrical potential of Vcc volts, follow the information flow and note that the potential begins at the S-node potential of Vcc 210 and ends at the ground potential Vgnd 212. Depending on the strength (conductance) of weights 206 and 207, the potential Vp 211 may take on any value between Vcc and Vgnd. It should be recognized that it is presumed that a weight may take on a negative value for the purpose of the information flow. It is obviously not possible for a physical connection to possess a negative conductance. To resolve this conflict it must be recognized that a weight is actually a differential connection consisting of two alternate and competing pathways, as shown in FIG. 3.

Figure 3:
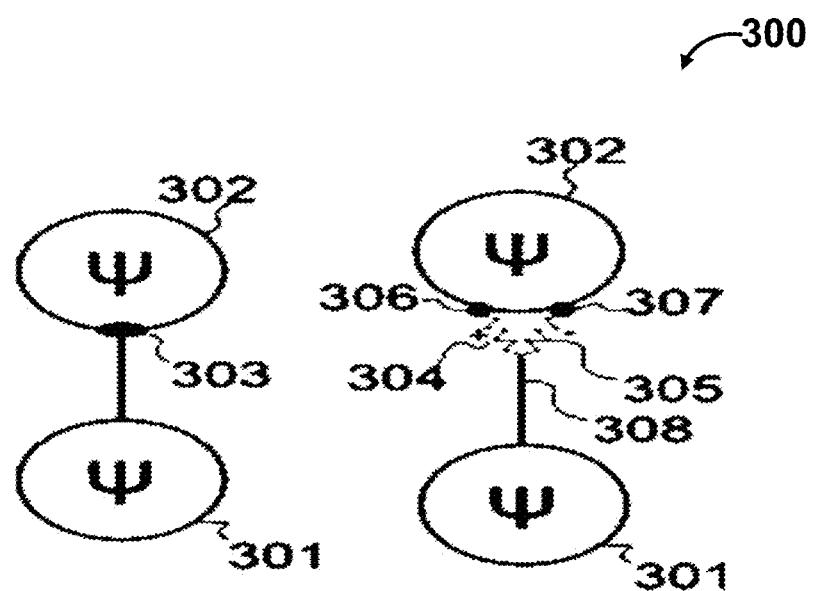
FIG. 3 illustrates a two-node circuit diagram of a system showing a weight constructed from two competing pathways, in accordance with the disclosed embodiments.

FIG. 3 illustrates a two-node circuit diagram 300 of a system showing a weight constructed from two competing pathways Consider weight 303 between nodes 301 and 302. The physical circuit may be constructed by splitting node 301's output pathway 308 into two competing pathways, such as positive (+) pathway 304 and negative (−) pathway 305. Charge may be accumulated on capacitors 306 and 307 over some unit of time. Depending on the voltage of the capacitors after this accumulation, node 302 may evaluate into the logical high or low state upon the application of positive feedback. The $i^{th}$ weight value can be represented as $w_i = s_i^+ - s_i^-$, where $s_i^+ > 0$. $s_i^+ > s_i^-$ indicates the weight is "positive" while $s_i^+ < s_i^-$ indicates that the weight is negative.

Each weight is a result of a competition between two pathways. As the information flow evaluates the state of the weight, the secondary energy flow rewards the winning pathway with a stabilizing current while the losing pathway suffers spontaneous decay. Over time this competitive mechanism drives thermodynamic self-organization. The state of a node's weights configure the node's function while the node's function ultimately governs the predictive ability of a circuit. As a pathway dissipates more energy its conductance is increased. When an information pathway predicts an S-node's logical state, the pathway's conductance will increase and stabilizing current will flow, ultimately stabilizing the entire circuit pathway that led to the predictions while decaying the alternate pathways that lost the forward information-flow competition. The only way for the system to configure to maximize its energy dissipation is therefore through the creation of weight structure and thus the stabilization of nodes with distinct logical states. The core process can be summarized in FIG. 4.

Figure 4:
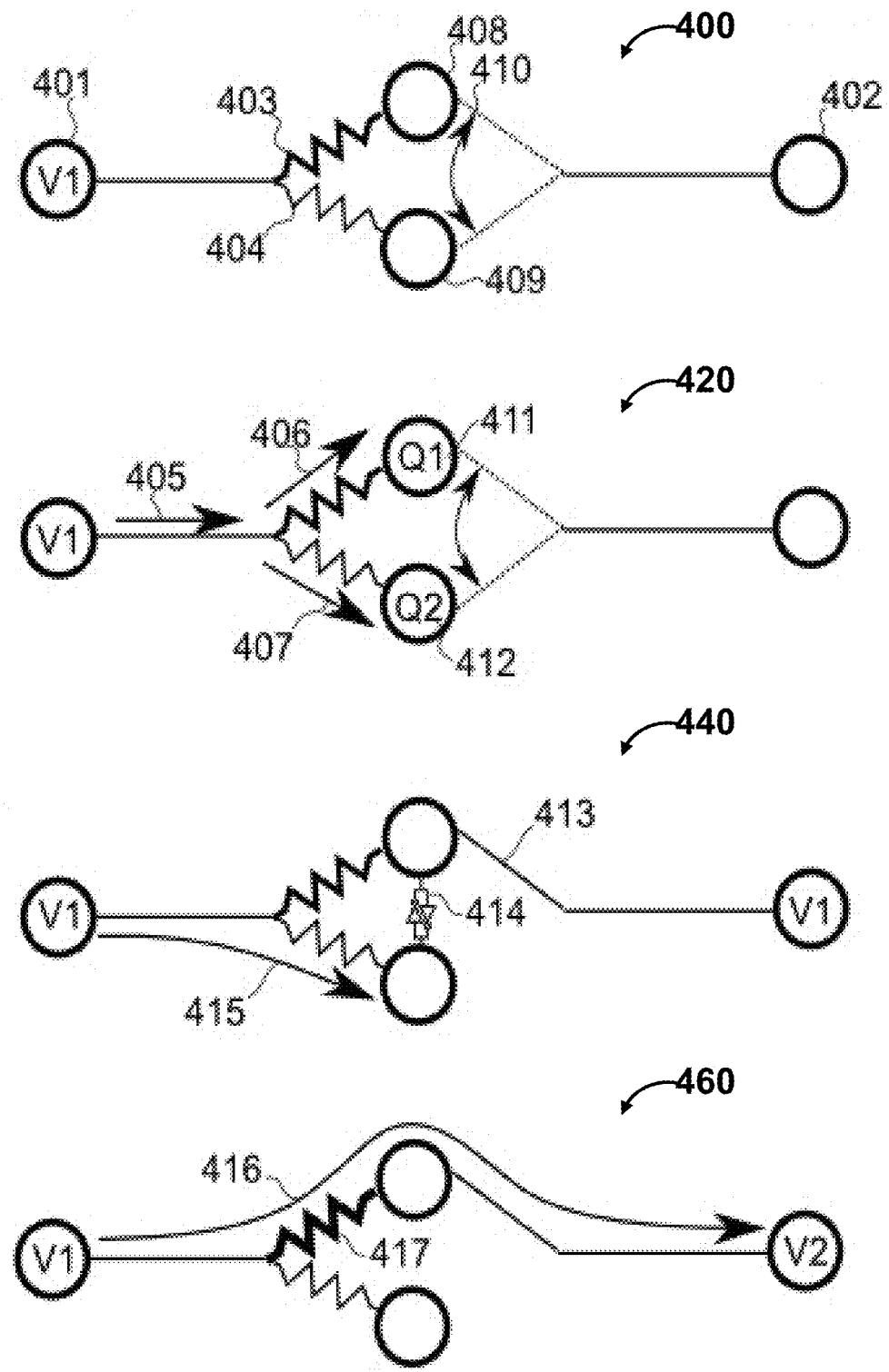
FIG. 4 illustrates a circuit of a system self configuring itself to dissipate energy, in accordance with the disclosed embodiments.

FIG. 4 depicts a simple circuit during the phases 400, 420, 440 and 460. During phase 400, node 401 projects a positive potential V1 through pathways 403 and 404. Let us suppose that V1 is a logical high potential. Energy dissipating current 405 is split into currents 406 and 407 to charge nodes 408 and 409, respectively. Switch 410 is in an indeterminate state while node 402 is at a floating potential. During phase 420, nodes 408 and 409 have accumulated an energy potential. In an electronic circuit this is represented by charges Q1 411 and Q2 412. During phase 440, internal positive feedback 414 is applied. The function of the positive feedback 414 is to force a competition between nodes 408 and 409 such that one node is driven to a logical high and the other to a logical low. In this example let us suppose that node 408 has accumulated a higher charge and thus is driven to logical high during the application of positive feedback 414. The application of positive feedback 414 may be said to evaluate the state of nodes 408 and 409 so as to project the state further into the network. Note that the switch 410 has resolved such that it will propagate current through node 408, as indicated by 413. During the application of positive feedback 414, it can be seen that current 415 flows from node 401 to node 409, since positive feedback 414 maintains potential drop across the pathway 404, while forcing nodes 408 and 402 to the logical high potential V1. During phase 460, the potential of node 402 changes, which attribute to an environmental event. If V2<V1 a current 416 sets up through pathway 417.

The resistance to flow of an energy dissipating current is lessened as more flow is passed through a pathway. One example within the electronics domain is a memristor. A real-world example is the carving of a canyon via the abrasive action of flowing water. As the energy-dissipating water flows over the volatile ground, the ground is reconfigured into a channel to lessen the resistance to flow. This is simply a property of matter. The pathways 403 and 404 will react to currents over phases 420, 440 and 460 by decreasing their resistance to flow, i.e. increasing their conductance when current is passed through them and increasing resistance to flow in the absence of current due to decay.

During phase 420, currents 406 and 407 evaluate the pathways. In this example, the pathway 403 is more conductive than pathway 404, which are represented by a thicker line. Over a period of time less the natural "RC" time constant of the pathways, more potential has accumulated onto node 408. If the effective energy storing capacity of each node is equivalent then the pathway 403 dissipates more energy than pathway 404. As a result, during this period, pathway 403 will increase in strength slightly more than pathway 404. During phase 440 the application of positive feedback 414 forces a large energy potential across pathway 404 while creating a zero-potential across pathway 403. Since it was the condition that pathway 403 was more conductive than pathway 404, it can be concluded that during phase 440, the state of the weight is degraded. That is, pathway 404 is increasing in conductance while pathway 403 is being weakened due to decay. Since the application of internal positive feedback 414 is necessary to project the evaluation state, it can be concluded that projecting a state ultimately acts to degrade the state.

For the phase 440 to extend for a sufficient duration, the pathway 404 will increase to a point where it is now more conductive than the pathway 403. At this point, pathway 404 will be selected when the weight is re-evaluated. Projection of the state or the application of internal positive feedback actually results in negative feedback to the state. The damage incurred through negative feedback during phase 440 is reversed during phase 460, when the node 402's potential drop below the potential of V1. This may occur because of actions in the environment. A prediction occurs when a pathway is formed that will benefit from energetic stabilization and a potential difference arise.

To relate this analysis to FIGS. 1 and 2, the node 402 is a S-node since its logical state (as represented by voltage V2 during phase 460) is set by the environment and not internal positive feedback. Thus, the stability of a weight's state, as represented by one pathway being of larger conductance then another, is directly related to how much energy that state can harvest from the environment. If the amount of energy harvested is high, the weight can support very large structure, i.e., one pathway can be maintained at a much higher conductance.

The basic mechanism outlined in FIG. 4 occurs in the natural world at many scales. To fully appreciate this fact let us compare it to a scenario that have more direct experience with in the world of business. When a company is formed it survives at first on the wealth of its founders or of investors. This is where the internal positive feedback originates. Let us suppose that the company was ultimately a failure so that the interval energy reserves are depleted while no external wealth is harvested from the economy. If such is the case, the pathway that is represented by the company is damaged in that it is less likely that such a company will maintain its old state when a new investment round be acquired. On the other hand, if the company does manage to harvest wealth then its structures will be stabilized. However, it is certainly possible that the amount of wealth harvested is less than the amount of wealth invested in the company structure. In this case, if it is possible to shed internal structure so that the amount of wealth harvested exceeds or equals the amount of wealth invested in the projection of state, such decay will occur and the company will stabilize on the available wealth flow.

As another example, consider the actions of two lions, L0 and L1, that must search for food in a hostile environment. Suppose that at some time both animals are located in the same position P0, and that two alternate watering holes are available, W0 and W1. Watering hole W0 is separated by a greater distance such that more energy must be expended to reach it, but the odds of finding food are higher. Let us suppose that the evaluation of lion L0's state causes it to walk to W0, while the evaluation of lion L1's state causes it to walk to W1. In this example, each lion is damaging its state as it is evaluated. The more energy the lions expends without attaining energy from the environment the closer they are to death.

If it is the case that lion L0's state enabled it to attain energy while lion L1's state did not, lion L0 will be selected in the sense that its state will be stabilized. Note that the selection of lion L0 occurs because it has dissipated more energy from the environment. Survival of the fittest is more accurately reframed as stabilization of successful energy dissipating pathways. As the path connecting P0 and W0 was crossed a trail is formed. The trail guides the lion while also making the journey easier by removing obstacles along the way. Not only has the structure of the lion been selected, but the physical trail that connects the lion's food source is now stabilizing. At all levels, matter is configuring itself for dissipating energy.

Figure 5:
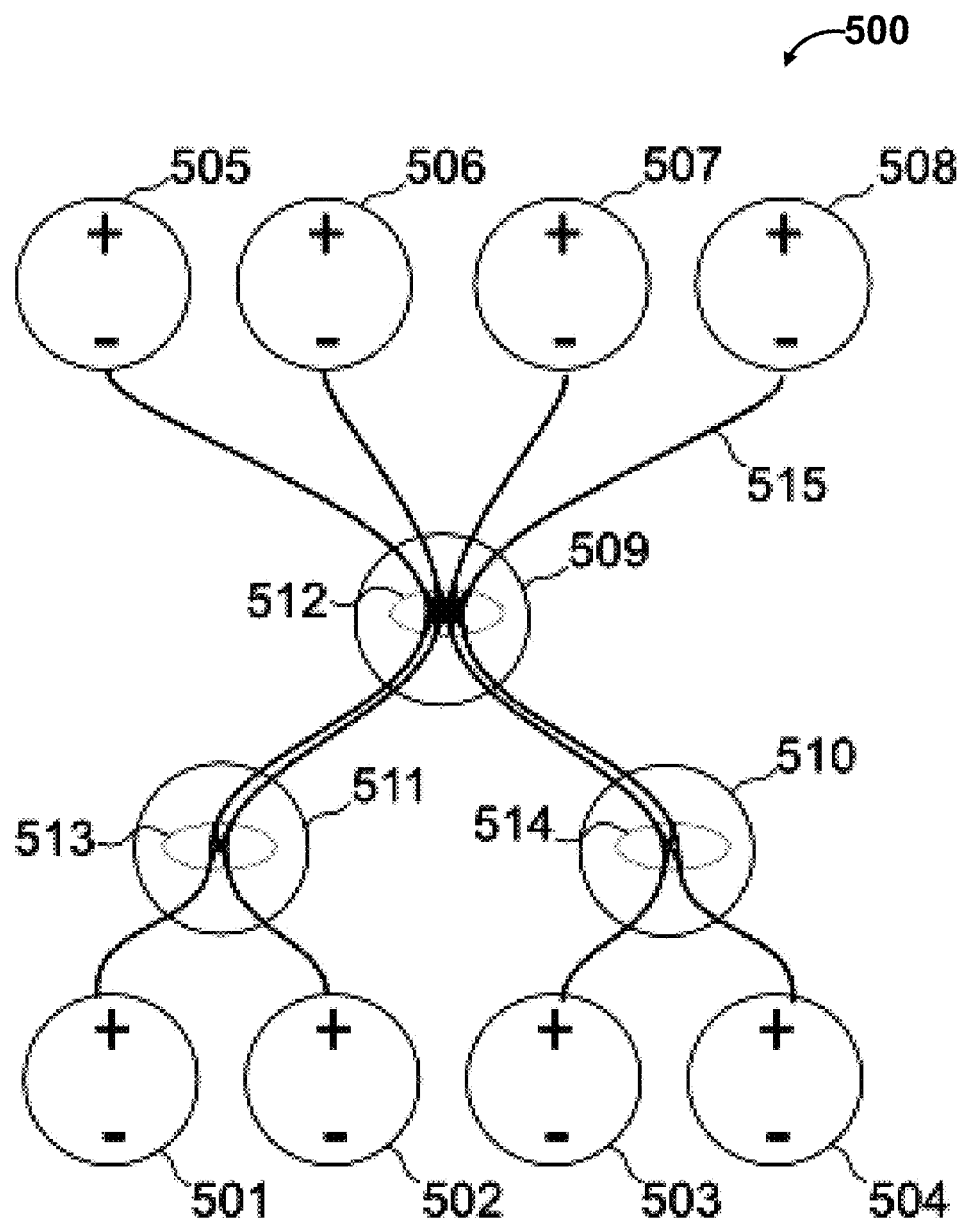
FIG. 5 illustrates a network of a system formed between S-nodes, self configuring itself to dissipate energy, in accordance with the disclosed embodiments.

Consider FIG. 5, which depicts a small network 500 formed between S-nodes 501, 502, 503, 504, 505, 506, 507 and 508. P-nodes 509, 511 and 510 form a small energy-dissipating network. The energy dissipation flows can be depicted as in 515. Node 509's total contribution to energy dissipation can be represented as the total current that passes through the node in a unit time, represented by cross-section 512. Note that node 509's dissipation 512 is higher than either node 511's dissipation 513 or node 510's dissipation 514. Therefore, the node 509's state is more stable than node's 511 or 510. The node 509 is able to maintain more structure, which enables the node's configuration bits to increase in magnitude further above the noise level resulting from decay.

When S-nodes cease to provide a potential for a time period T, the node 509 has a much higher probability of maintaining its state relative to nodes 511 and 510. Thus when nodes must re-configure into a new network after a period of reduced global energy dissipation, the network preferentially explores configurations based on more successful base elements. That is, those nodes which dissipated more energy before a period of starvation will preferentially survive as the building blocks of a new configuration.

A node with a circuit, or a circuit of circuits, etc, can be equated such that as a large network decays from starvation its first break points are those pathways that dissipated the least amount of energy. As this fragmentation occurs, the fragments project their state (and actively damage it) into the network in search of energetic feedback. Thus, the most likely explored configurations are networks composed of the more energy-dissipating sub-networks of the prior evolved structure. In a hostile environment where energy potentials are constantly shifting, those network fragments that can be used in more situations will stabilize for longer periods. That is, in a constantly changing environment solutions will preferentially be built from modular subcomponents that find use in most or all situations.

Figure 6:
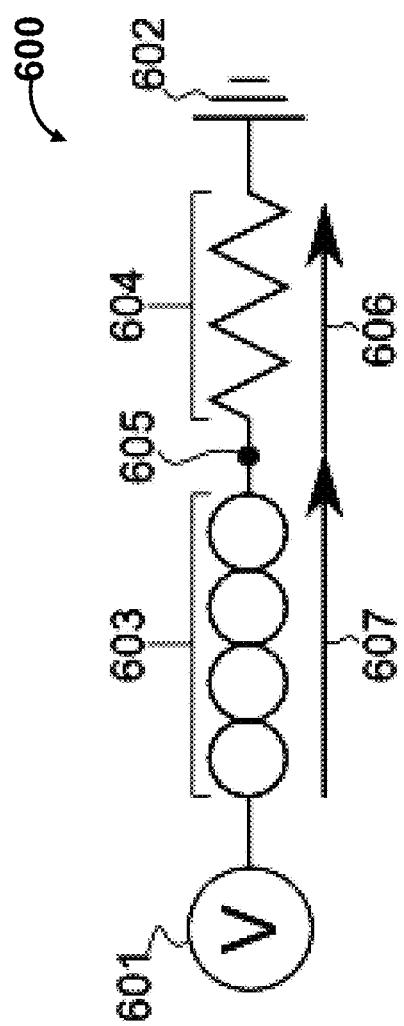
FIG. 6 illustrates an electronic circuit of a system dissipating maximum power through an electronic device and a resistor, in accordance with the disclosed embodiments.

Referring to an electronic circuit 600 of FIG. 6, a potential 601 is dissipated through a device 603 and a resistor 604. The current 607 and 606 through the devices 603 and 604 are shown. The key property of the device 603 is that its conductance changes as a function of the current that passes through it such that it converges to a conductance that maximizes its power dissipation. In the circuit of FIG. 6, this will occur when the resistance of the device 603 equals the resistance of the resistor 604. This, in fact, is the defining criteria for the device 603. An example of such a device is a Knowm connection as described in U.S. Pat. No. 6,995,649 and other Patents of Alex Nugent. This device consists of the aggregation of nanoparticles into a gap between energetically charged electrodes. Particles will accumulate at the connection gap and lower the resistance until it maximizes the power dissipation. The point where maximization of power dissipation occurs is a function of the impedance of the potential source. Such a device can be called as a knowmristor.

Figure 7:
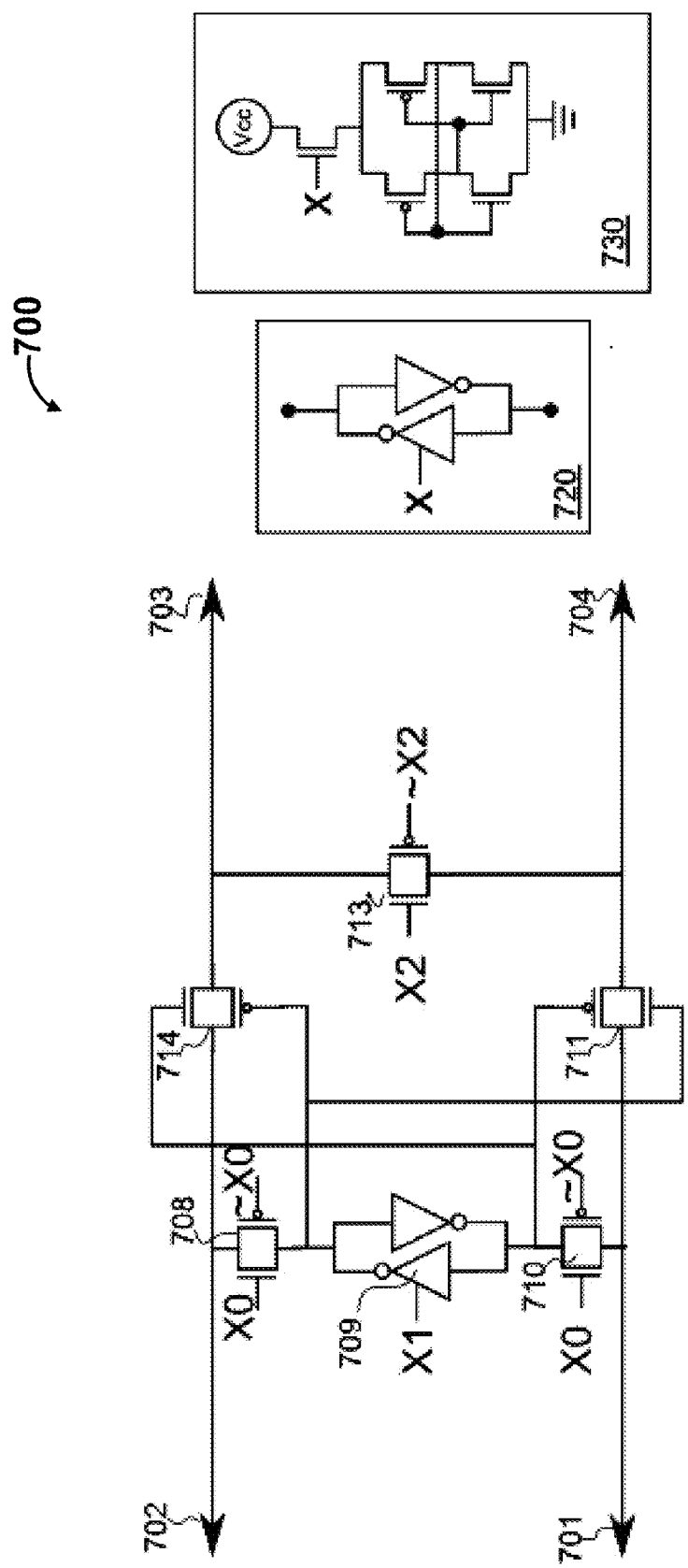
FIG. 7 illustrates a node circuit of a system self-organizing to increase the dissipation of energy, in accordance with the disclosed embodiments.

Volatile matters ability can be exploited to self-organize so as to increase the dissipation of energy. FIG. 7 illustrates a node circuit 700. Input electrodes 702 and 701 integrate charge through knowmristive elements. Positive feedback circuit 709 evaluates and projects the state via output electrodes 703 and 704. Positive feedback circuit 709 is detailed as circuit 720 and expanded in circuit 730. That is, circuit 720 is equivalent to circuit 730 and could be used as a positive feedback circuit 709. Via a mechanism that will be described, the pathway selected by the node during the evaluation phase is exposed to the energy potentials of the environment. If the node acts with other nodes to predict an environmental potential, dissipating current will flow and stabilize the pathway, which predicted the environmental potential.

The process occurs in two phases. During the first phase the node selects its state. The application of positive feedback drives passgate 711 to open and pass-gate 714 to close, or vice versa, depending on the evaluation state of the node. A passgate is "open" if it is conducting and "closed" if it is non-conducting. Passgate 708 and 710 are opened due to control line X0, exposing positive feedback circuit 709 to the input and output lines. Output electrode 703 is charged to a logical high and electrode 704 is held floating, or vice-versa, depending on the evaluation state of the node as determined by the positive feedback circuit 709. This constitutes the evaluation and projection phase. The purpose of this phase is to integrate charge through knowmristors to evaluate a state and then project this state further into the network. In the next phase, passgates 708 and 710 are closed while positive feedback circuit 709 is held on. That is, control line X0 is held low while the control line X1 is held high. This serves the purpose of shielding the positive feedback circuit 709 from the input and output lines while driving passgates 714 and 711. The node circuit participates in a path that predicted an environmental potential, current will flow through knowmristors responsible for the nodes state. Finally, the node is reset with passgate 713 via control line X2 so as to equalize the charge and prepare the node for a new evaluation.

Figure 8:
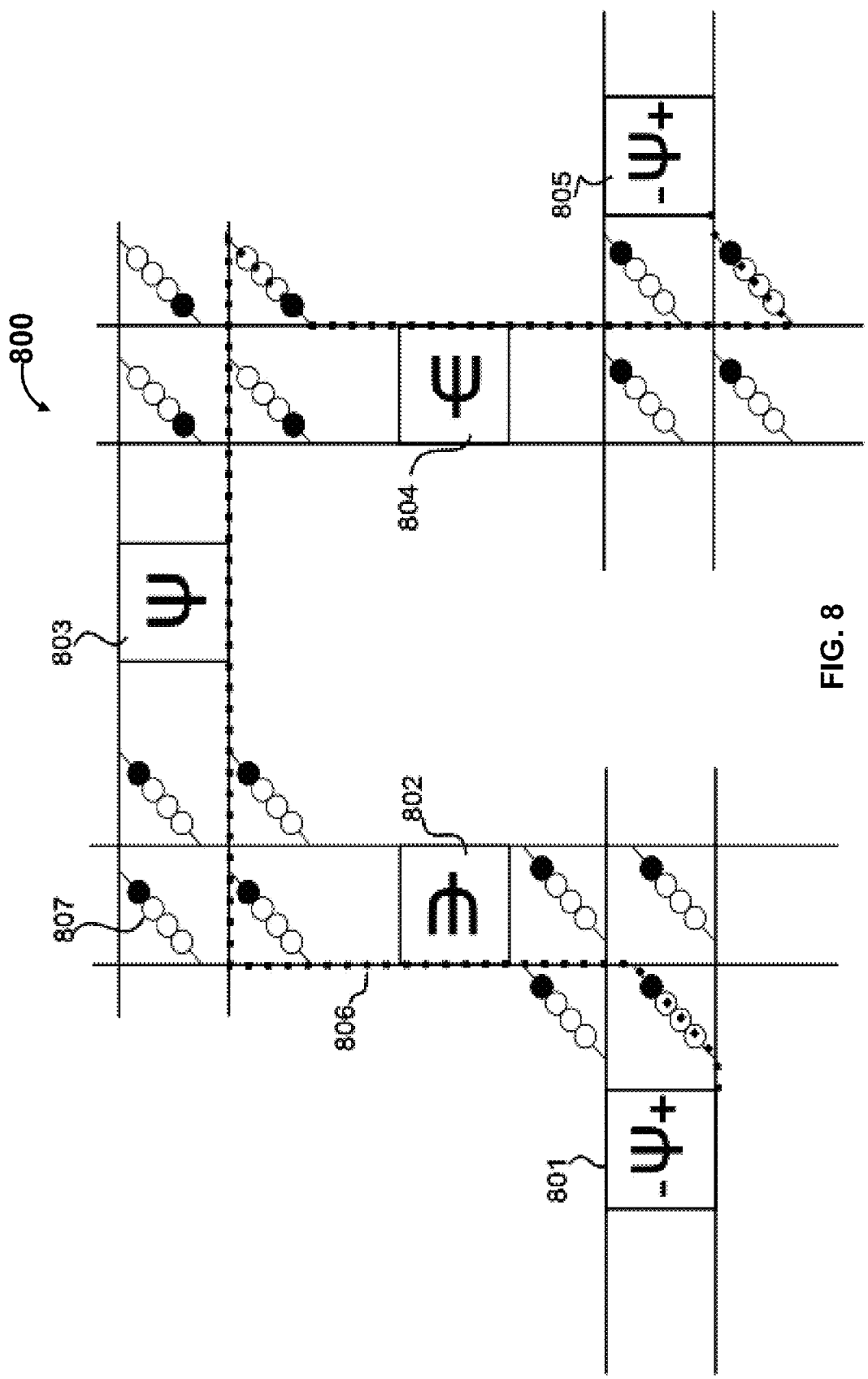
FIG. 8 illustrates a schematic diagram of a conductive path selected by P-nodes, in accordance with the disclosed embodiments.

FIG. 8 illustrates a schematic diagram 800 of a conductive path 806 selected by P-nodes 802, 803 and 804. S-nodes 801 and 805 deliver a potential that drives a stabilizing current through pathway 806, which was selected by the P-nodes 802, 803 and 804 during their evaluation of state. This process occurs in two phases. In the first phase pathway 806 represents the flow of information from S-node 801 to S-node 805 and represents a prediction. During this phase the S-node actively drive their output electrodes while leaving their input electrodes floating so as to collect charge. During the next phase the S-nodes maintain a drive on their output electrode while grounding their respective input electrodes. This is illustrated in FIG. 9.

Figure 9:
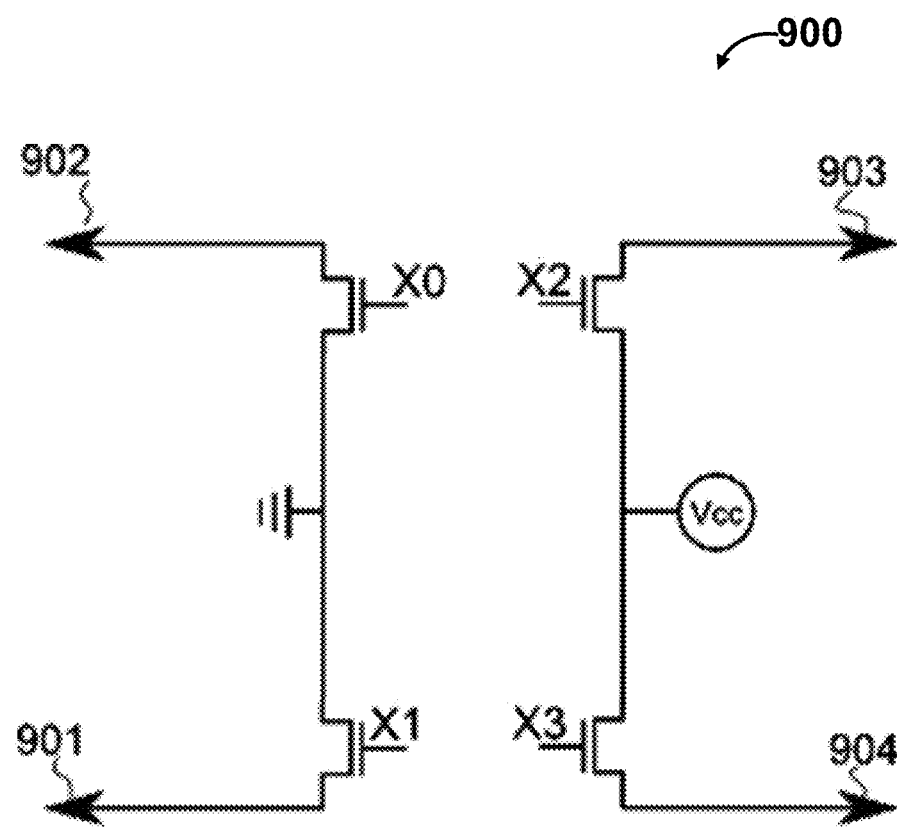
FIG. 9 illustrates an S-node circuit of a system, in accordance with the disclosed embodiments.

FIG. 9 depicts a S-node circuit 900. As can be seen, all functions of the S-node are under external control via control lines X0, X1, X2 and X3. During the evaluation phase control line X2 is high and control line X3 is low, or vice versa depending on the projection state. Control lines X0 and X1 are both low so as to isolate input electrodes 902 and 901 from a conducting path to ground. During the feedback phase, either X0 or X1 is raised high so as to create a conducting path to ground and thus set up an energy dissipating pathway such as pathway 806 depicted in FIG. 8. If, for example, X2 was high on the evaluate phase then X0 is high on the feedback phase. Likewise, if X3 was high on the evaluate phase then X1 is high on the feedback phase. The basic idea is that an S-node is simply providing an energetic "information" projection state into the network via its output electrodes 903 and 904 while supplying a feedback potential on its output electrodes 902 and 901 that reinforce the prediction of its projection state.

The example circuits 700 and 900 are one possible implementation, although many more exist. Depending on the functionality required, alternate configures are desirable. Since many possible configurations exist, the basic function that a circuit implementation must possess is disclosed rather than detailing every possibly. Although the circuit 700 is not possible of universal logic capability as diagramed. This situation may be rectified in a number of ways. For example, a bias input may be included such that the bias input is always in one state. That is, a bias is achieve via the addition of an input line (and the corresponding knowmristors) such that the input is always in the logical high. This constant dissipation path enables the node to access logical state that enable collections of nodes to achieve any possible logical function. The down side of this approach is that these states are less stable.

Another mechanism is to create a more complex circuit consisting of two nodes and dedicated logic. This approach is detailed in, for example, U.S. Pat. No. 7,426,501 Titled "Universal Logic Gate Utilizing Nanotechnology". Another approach is to encode node activations via a zero-state. What this means is that one evaluation state results in the activation of the output electrode to a high potential while the other state evaluation simply lets the output electrode float, hence "zero". These three methods are called as Bias, Logic and Zero configurations respectively.

In all of these methods multiple circuits exist each with multiple electrode configurations, for example two inputs one output, two input two outputs and one input two outputs. There are thus 3^3 or 27 basic circuit configurations. The core functionality that must be attained in all of these configuration is simply that a node must be capable of evaluating its state, projecting the state into the network, and retaining an internal memory of its projection state such that stabilizing current from S-nodes may be directed toward the synaptic elements that enabled the nodes state. It can be appreciated that many possible circuits may be constructed for each of the 27 basic configurations. Anybody skilled in the art should be capable of constructing any of the configuration so long as they understand the basic mechanisms at work, which have been disclosed herein.

Figure 10:
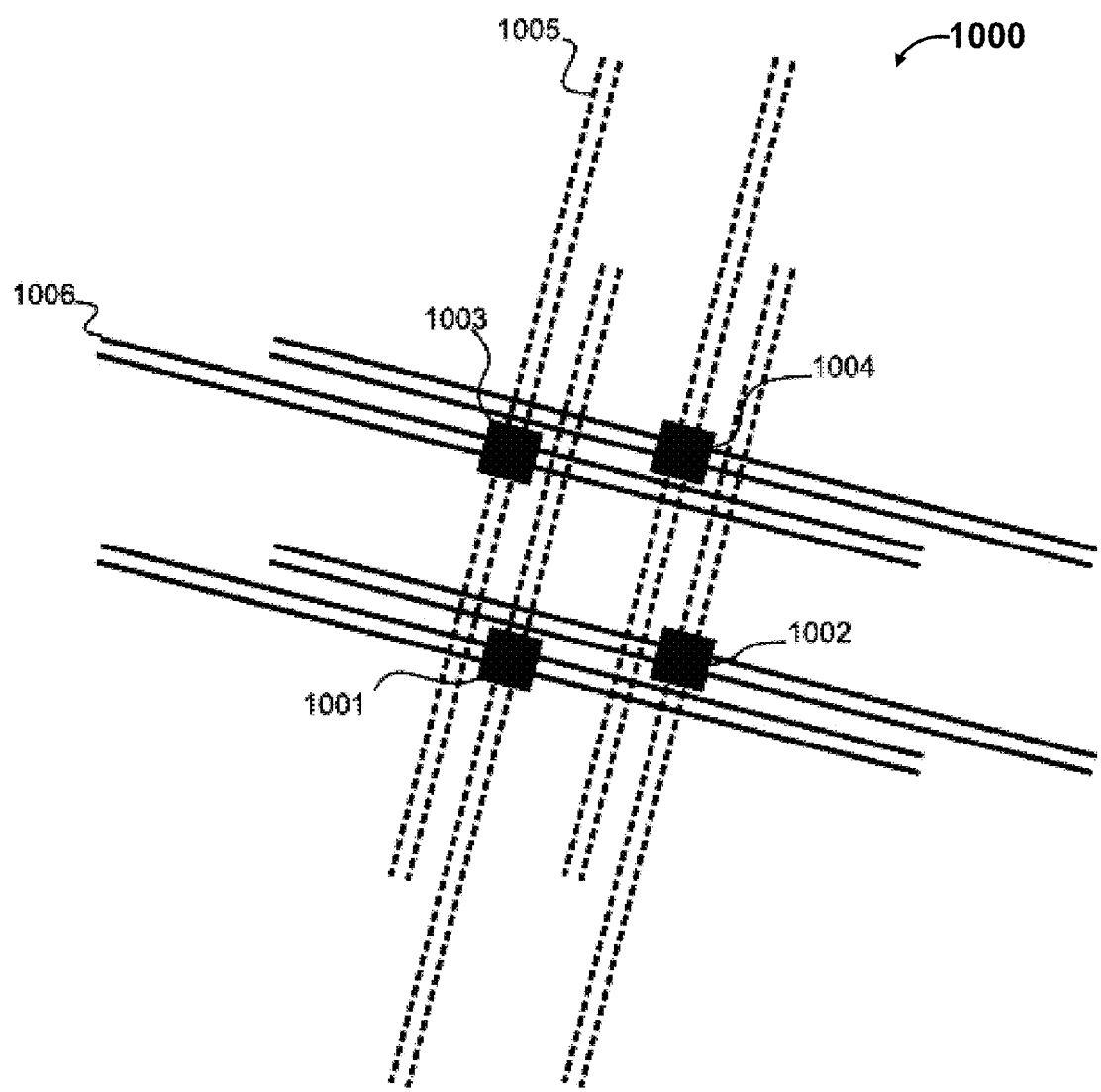
FIG. 10 illustrates a "cross-net" network architecture organizing into predictive circuits, in accordance with the disclosed embodiments.

FIG. 10 illustrates the "cross-net" architecture 1000 as originally described by Dr. Likarev. Such an architecture allows a tiling of nodes 1001, 1002, 1003 and 1004 across a surface such that local recurrent connections are possible while allowing high input-output connectivity. Note that such architecture should allow node circuitry to be constructed in, for example, CMOS electronics while knowmristors are formed at the intersections of input and output electrodes. In this case the output electrodes are indicated as dotted lines 1005 and input electrodes as solid lines 1006. In such an architecture, a subset of the nodes can be assigned to the role of S-node such that they provide the environmental potentials. Nodes will organize into predictive circuits that may be used for autonomous control systems.

Competing energy-dissipating pathways is the heart of the physical-self organization mechanism. This process can be explained via a simple mathematical weight update rule, also known as a synaptic plasticity rule. This allows us to understand how turing-complete circuits may emerge from the above described circuits and methods.

Consider a homogenous collection of interacting Sensory nodes (S-nodes) and Processing nodes (P-nodes). S-nodes are driven by external stimuli arising from the environment and create potentials. P-nodes are driven by sensory nodes or other processing nodes.

Each P-node's internal activation is the result of a sum over its input weights:

$$I_{in} = \sum_{i}^{n} w_i x_i \qquad \text{Eq (3)}$$

where n is the total number of inputs to the node, wi is the ith input and xi is the ith input.

The output of the node y, is given as a threshold value of $I_{in}$.

$$y = \begin{cases} 1 & I_{in} > t \\ 0 & I_{in} < t \end{cases} \qquad \text{Eq (4)}$$

$$y = H[I_{in} - t]$$

The operator H[ ] can be understood, for example, as internal positive feedback circuit 709 in FIG. 7.

Each node maintains an energy potential V on an internal capacitor based on the dissipation flows between S-nodes. The outgoing current $I_{out}$ can be defined as the sum total outward flow through all output connections:

$$I_{out} = \sum_{j}^{m} w_j (V - V_j) \qquad \text{Eq (5)}$$

$I_{in}$ represents the total flow of current being dissipated by the system for evaluation and project of state. This can be compared to the flow 415 of FIG. 4, which acts against the state of the node. On the other hand, $I_{out}$ represents the environmental energy potential being dissipated via the circuit formed by the node and as such represents a stabilizing force. $I_{out}$ can be equated to flow 416 of FIG. 4.

The node may update its input weights according to the Anti-Hebbian And Hebbian (AHAH) plasticity rule:

$$\Delta w_i = \alpha x_i (I_{out} - I_{in} + \eta) \qquad \text{Eq (6)}$$

Where $\alpha$ is a learning rate defined by the physical characteristic of the knowmristors, $x_i$ is the $i^{th}$ input and $\eta$ is a random noise parameter with an expectation of $\langle\eta\rangle=0$. Although $\eta$ emerges naturally from a physical system it has to be included explicitly in mathematical model. The instance of the AHAH rule defined in Equation (6) can be understood in a number of ways. Note that the rule provides Hebbian learning when $I_{out} > I_{in}$ and Anti-Hebbian learning when $I_{out} < I_{in}$. The condition where $I_{out} > I_{in}$ is referred as the anabolic phase and $I_{out} < I_{in}$ is referred as the catabolic phase. If the state of the node's synaptic weights are interpreted as the nodes logic function, the nodes logic function is degraded in the canabolic phase and strengthened in the anabolic phase.

A simple geometric method can now be introduced to visualize the attractor states of the AHAH rule within a two-dimension framework. Assume a node has achieved feedback so that $I_{out}=1$. Under this condition, the update to the nodes input weight is of the form:

$$\Delta w_i = x_i (I_{in} - 1) \qquad \text{Eq (7)}$$

Let us suppose that the node has two inputs so that the four possible input patterns are:

$$[x_0, x_1] = [0,0], [0,1], [1,0], [1,1] \qquad \text{Eq (8)}$$

The nodes internal activation, $I_{in}$, can be written as:

$$I_{in} = w_0 x_0 + w_1 x_1 \qquad \text{Eq (9)}$$

The decision boundary can be plotted by solving Equation (9) for where $I_{in}=0$:

$$0 = w_0 x_0 + w_1 x_1 \qquad \text{Eq (10)}$$

$$x_1 = \frac{-w_0}{w_1} x_0$$

Figure 11:
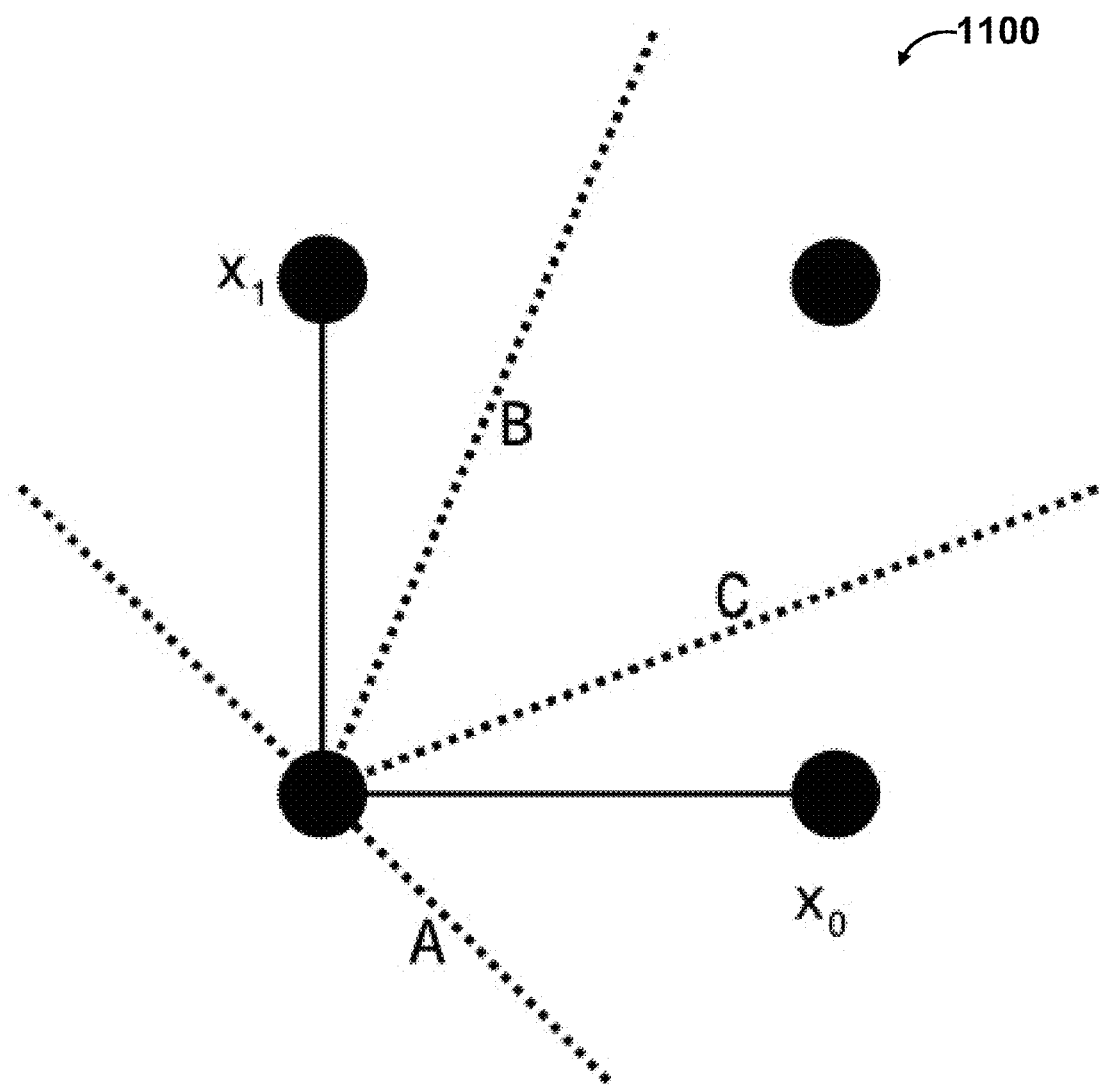
FIG. 11 illustrates a plot showing node's decision boundary with data, in accordance with the disclosed embodiments.

The weight vector will remain stable when the sum total over all of the weight updates is zero. Therefore the nodes decision boundary can be plotted on the same plot with the data that produced it. The plot 1100 is shown in FIG. 11. where decision boundaries are labeled as A, B and C. Each decision boundary represents a state and its anti state, since two solutions exist for each stable decision boundary. It is straight-forward to derive these stable synaptic states.

Figure 12:
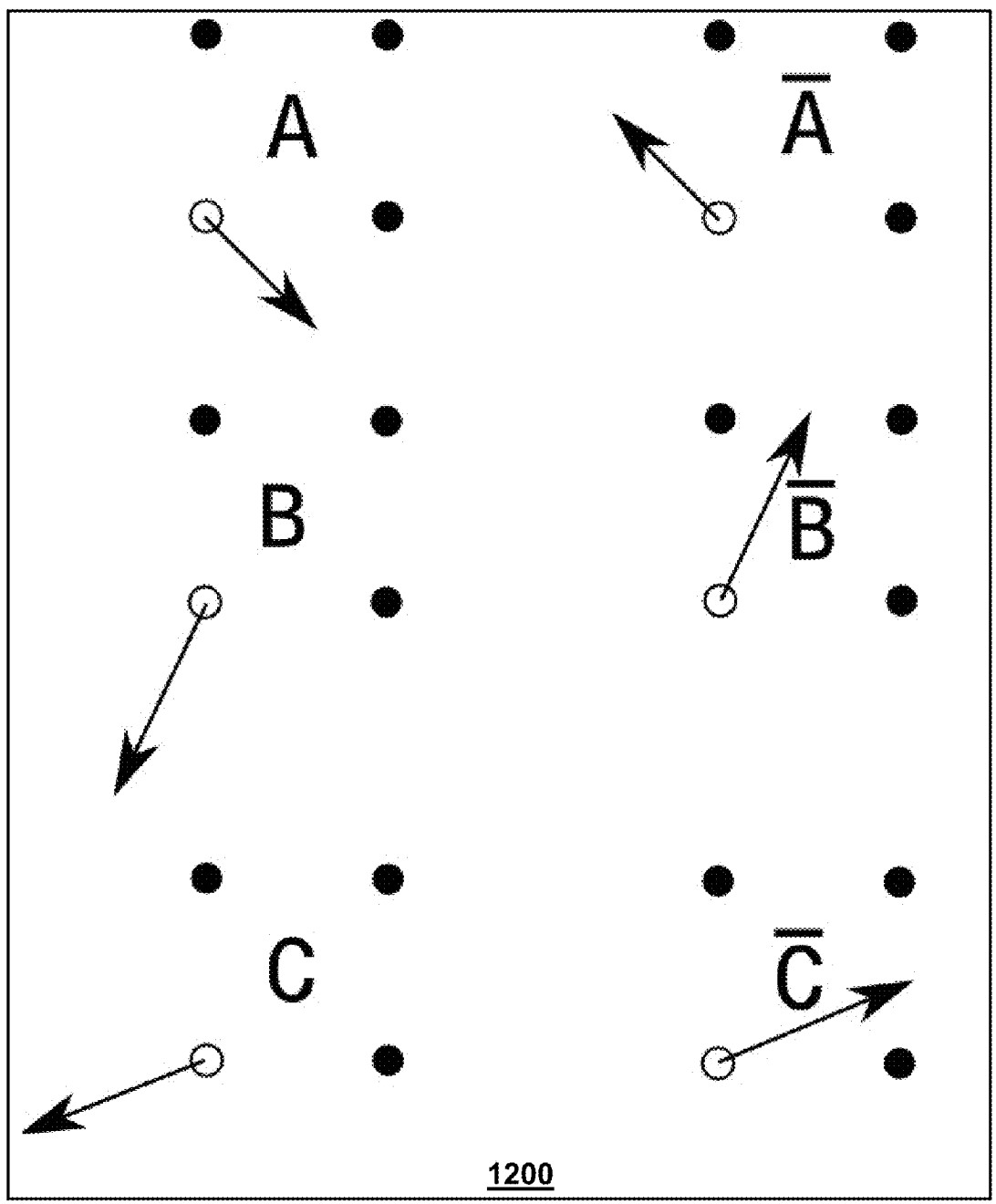
FIG. 12 illustrates a plot showing six possible states for a two input data distribution, in accordance with the disclosed embodiments.

Allowable states can be seen as bisections, where each bisection must go through the origin and split the data space. To account for the state or anti-state, the decision boundary will be drawn as an arrow, and the right-hand rule is used to find the positive-going direction. The six possible states for a two-input data distribution 1200 can then be diagramed as in FIG. 12.

Each stable synaptic state is a logic function. This can be seen by constructing a truth table 1300 as shown in FIG. 13, where, for example, synaptic state (SS) A corresponds to logic function (LF) 8. Of interest is that logic functions 0-7 cannot be attained as that would required the node be able to generate an output while with no active inputs. However, the synaptic states and their corresponding logic functions are still computationally complete. To understand this review the concept of zero in light of binary logic is to be reviewed.

In binary logic systems, the notation of 0 and 1 should perhaps less confusingly be labeled −1 and +1 since the logical negative of "0" is "1". The mathematical definition of zero as it is used in a physical system is quite important and is taken to mean "nothing" or "floating" rather than "the opposite of one". For example, suppose node X connected to node Y through synapse s. If X's output was "0", Y's activation due to A is zero, since 0*s=0. It is therefore impossible for a node to generate a deterministic output activation if all its inputs are zero. What this means practically is that at least one input must be active for a node to participate in a logic function. All possible two-input, one-output logic functions can be recovered by encoding two lines the logical "0" as [0,1] and the logical "1" as [1,0]. In this case always at least one active input to node can be insured. The challenge is to insure that logic function 9 and 14 can be attained.

Figure 14:
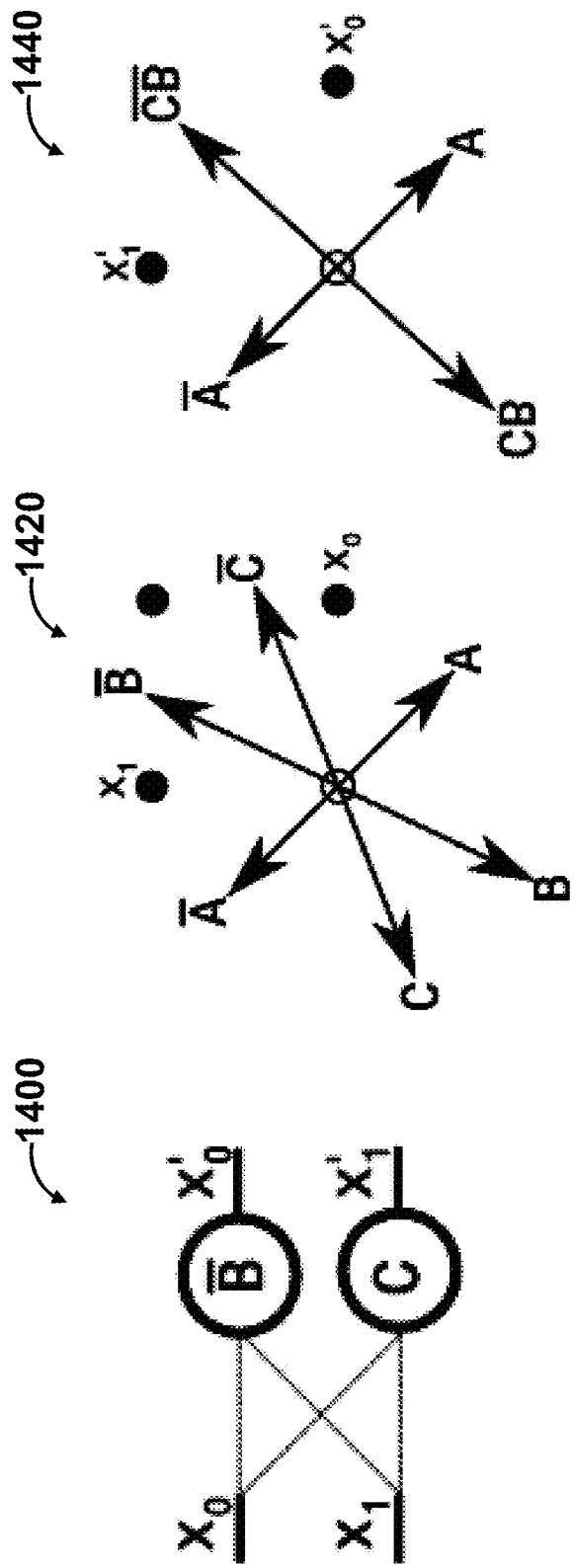
FIG. 14 illustrates a data structure of two node circuit in synaptic states $\overline{B}$ and C, in accordance with the disclosed embodiments.
Figure 15:
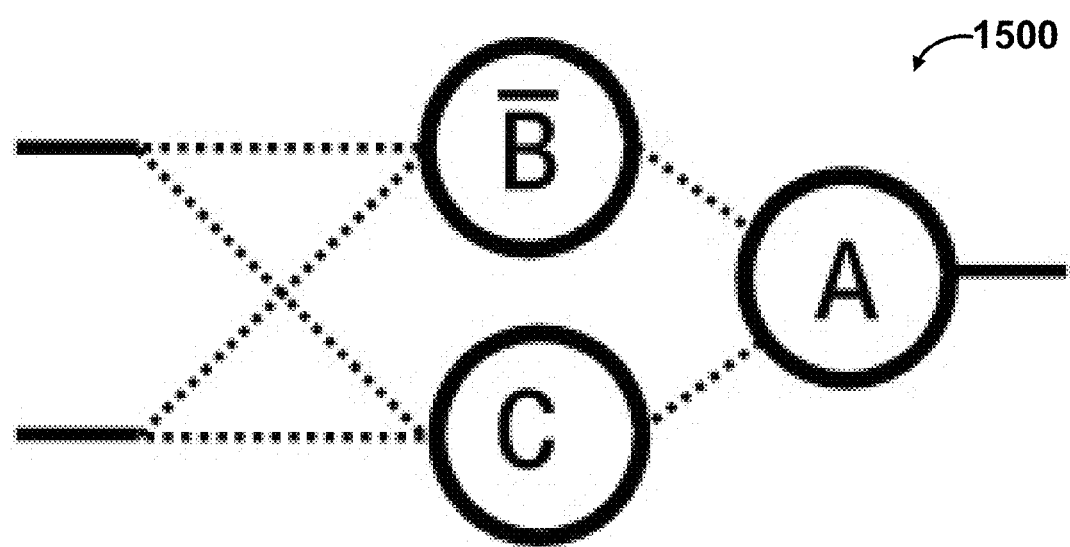
FIG. 15 illustrates a data structure of three node circuit in synaptic states A, $\overline{B}$ and C, in accordance with the disclosed embodiments.

Logic functions 9 and 14 correspond to the "XOR" and "AND" logic functions, respectively, and can be attained from a multi-node circuit. It is important to understand that the plastic states are defined by the structure of the data, so understanding how more complex circuits are constructed is not simply a matter of combining nodes in the synaptic states shown in FIG. 13. As combinations of nodes process information they may collapse the structure. As an example, consider two nodes in synaptic states B and C in the small network of FIG. 14. Whereas each node receives all input patterns, the output patterns of the nodes collapse so that input [1,1] is mapped to [0,0]. This causes states B and C to merge into one new state "CB". As information is processed its structure collapses, which reduces and changes the allowable plastic states available to a node. As shown in FIG. 14, the circuit 1400 shows two nodes each in synaptic states B and C, the input data structure 1420 supports six synaptic states and the output data structure 1440 supports four synaptic states as states B and C merge into one state "BC". In light of FIG. 14, achieving the XOR logic function requires nodes in states A, B and C as illustrated in FIG. 15. A similar procedure will yield logic function 14.

It will be appreciated that variations of the above disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. An electronic system for thermodynamic evolution, said system comprising:
    at least one node circuit with a logical state dependent on a configuration of volatile memory elements comprising at least one memristor, such that a mutation rate of said volatile memory elements is reduced as said at least one node circuit dissipates increasing energy, and wherein energy is acquired by said at least one node circuit as a function of a logical state of said at least one node circuit.

2. The system of claim 1 wherein said volatile memory elements comprise at least one transistor circuit.

3. The system of claim 1 wherein said energy acquired by said at least one node circuit is represented as a charge on a capacitor.

4. The system of claim 1 wherein said energy acquired by said at least one node circuit is represented as a conductance of said at least one memristor.

5. The system of claim 1 wherein said energy acquired by said at least one node circuit is represented as a binary number.

6. The system of claim 1 wherein said logical state configures dot product operations.

7. The system of claim 1 wherein said logical state configures a routing table.

8. The system of claim 1 wherein said energy is generated during predictions of sensory data via said at least one node circuit and said volatile memory elements.

9. An electronic system for thermodynamic evolution, said system comprising:
    volatile memory elements comprising at least one of a memristor and a transistor circuit; and
    at least one node circuit with a logical state dependent on a configuration of said volatile memory elements, such that a mutation rate of said volatile memory elements is reduced as said at least one node circuit dissipates increasing energy, and wherein energy is acquired by said at least one node circuit as a function of a logical state of said at least one node circuit.

10. The system of claim 9 wherein said energy acquired by said at least one node circuit is represented as a charge on a capacitor.

11. The system of claim 9 wherein said energy acquired by said at least one node circuit is represented as a conductance of a memristor.

12. The system of claim 9 wherein said energy acquired by said at least one node circuit is represented as a binary number.

13. The system of claim 9 wherein said logical state configures dot product operations.

14. The system of claim 9 wherein said logical state configures a routing table.

15. The system of claim 9 wherein said energy is generated during predictions of sensory data via said at least one node circuit and said volatile memory elements.

16. A method for thermodynamic evolution, said method comprising:
    configuring at least one node circuit with a logical state dependent on a configuration of volatile memory elements comprising at least one memristor, such that a mutation rate of said volatile memory elements is reduced as said at least one node circuit dissipates increasing energy, and wherein energy is acquired by said at least one node circuit as a function of a logical state of said at least one node circuit.

17. The method of claim 16 wherein said volatile memory elements further comprise at least one transistor circuit.

18. The method of claim 16 wherein said energy acquired by said at least one node circuit is represented as at least one of a charge on a capacitor, a conductance of said at least one memristor, or a binary number.

* * * * *